Sept. 15, 1953    J. L. GRING    2,652,371
PROCESS OF FORMING SPHEROIDAL CATALYST PARTICLES
Filed Dec. 20, 1949
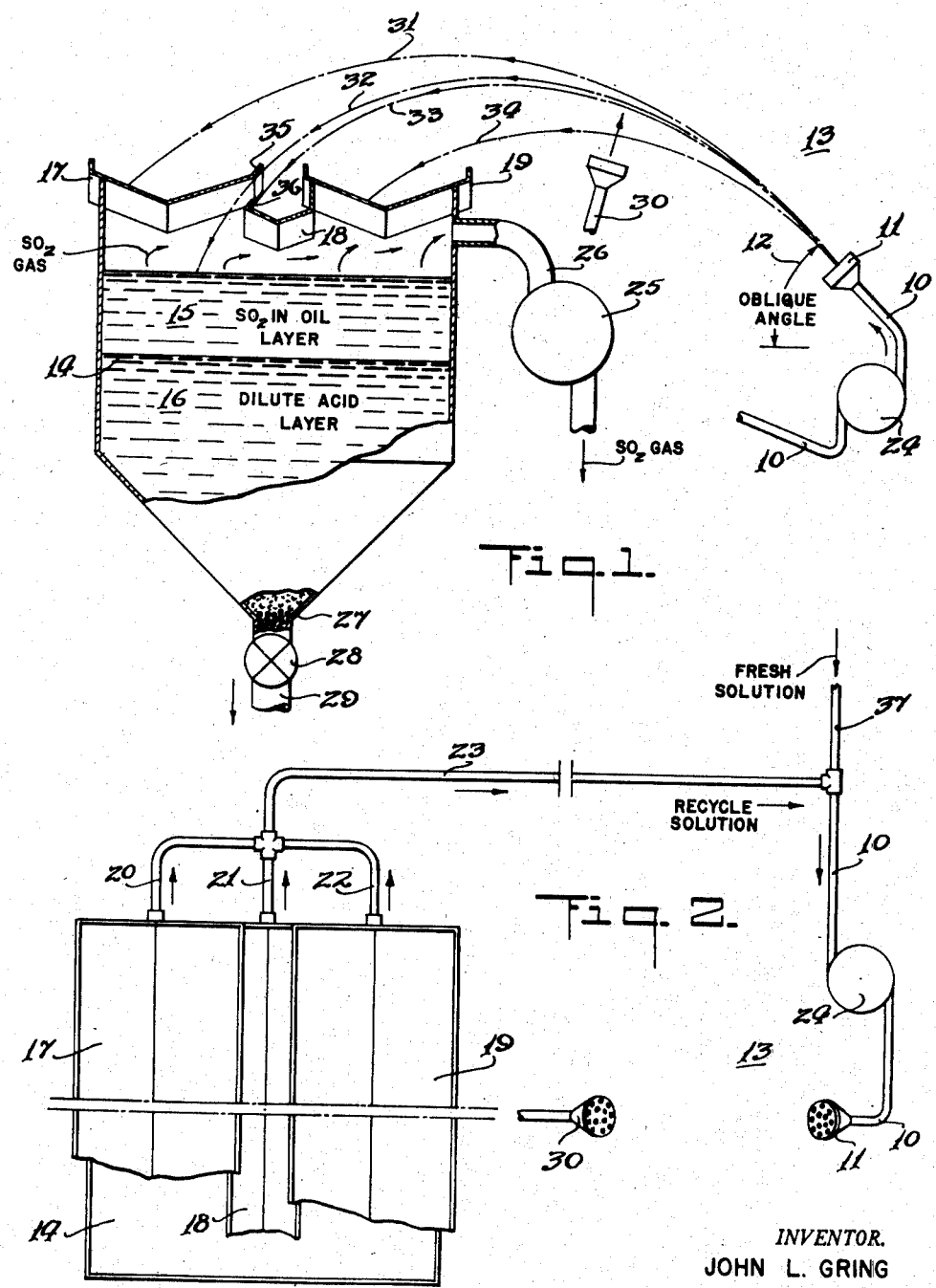
INVENTOR.
JOHN L. GRING
BY
Adams, Forward & McLean
ATTORNEYS.

Patented Sept. 15, 1953

2,652,371

UNITED STATES PATENT OFFICE 2,652,371

PROCESS OF FORMING SPHEROIDAL CATALYST PARTICLES

John L. Gring, Homewood, Ill., assignor to Sinclair Refining Company, New York, N. Y., a corporation of Maine Application December 20, 1949, Serial No. 134,075

2 Claims. (Cl. 252—448)

My invention relates to the preparation and size classification of small, substantially spherical, solid particles formed from a coagulative liquid.

Various proposals have been made to prepare small, solid particles such as microspheres. However, the solid particles so formed usually vary considerably in size and a manual separation according to physical magnitude or weight is extremely difficult due to their smallness. Accurate size classification is highly advantageous for many uses of these solid microspheres, e. g., when they are employed as catalysts or catalyst components in various catalytic operations. In particular, homogeneous silica gel microspheres, because of their spherical form and size similarity, provide excellent catalyst components for fluid catalyst cracking.

I have now discovered that small, substantially spherical, solid particles can be formed and accurately size classified or graded in a surprisingly simple, single operation which comprises discharging as a stream of droplets a coagulative liquid at an oblique angle, segregating the discharged droplets according to the difference in their trajectories or paths and selectively collecting homogeneous solid particles of desired size range. The discharge droplets are solidified by any suitable means after discharge and before collection. In addition, I have found it useful to subject the discharge stream before segregation to a cross-flow gas stream which will further improve the size classification. The oblique angle can be supplied by simply discharging the liquid at any angle between the horizontal and vertical from a conventional nozzle capable of delivering the liquid as a stream of droplets. Or the liquid may be discharged from a vertically-placed spray line to which is affixed a nozzle capable of projecting the discharge stream outwardly so that it then falls at the oblique angle. Or, the spray stream can be directed downwardly and the oblique angle of the stream trajectory or path supplied by at least one side cross-flow gas stream which will divert it from a normal gravity fall, the particles being selectively collected at intermediate points in the path of the stream and/or at the end of the path. The discharge liquid may comprise solutions or slurries capable of being coagulated or hardened, for instance, a stable aqueous sodium silicate solution, a hydrogel slurry or a hydrosol. The droplets may be solidified or hardened in a variety of ways, say by gelling in an acidic medium which may be a gas or a liquid, by simple hardening or coagulation in air with or without the aid of heat.

The size classification process according to my invention is predicated in large measure upon the physical phenomenon that the trajectories of the individual droplets will vary depending upon their size. Due to the interaction and/or the effect of gravity, the mass velocity force and atmospheric friction, the droplets of small size, for instance, will commence gravitating nearer to the spray orifice than will the larger droplets. That is, the trajectories of the droplets of small size will be less than those of droplets of greater size. In addition, since the droplets emerging from an atomized spray stream will vary in initial velocity, it is advantageous to subject the discharge stream of spray droplets to a cross-flow gas stream to improve size classification. In this way, particles of high velocity-low mass, and low velocity-high mass will have similar trajectories and the cross-flow stream will substantially divert the smaller particles in spite of their greater velocity.

To briefly illustrate one specific embodiment of my invention, an aqueous sodium silicate solution is atomized at an oblique angle into air, the discharged droplets being segregated according to the difference in their trajectories and the droplets of desired size range passing into a gelling environment or zone wherein they are hardened and then collected. The discharge stream is passed near the end of its trajectory through a segregating means comprising a plurality of vertically inclined troughs with one or more slit-like openings. Droplets of desired size of sodium silicate solution pass between the slit-like openings into a gelling zone, advantageously containing an acidic agent, while droplets of undesired size are collected in the vertically inclined troughs and recycled for subsequent discharge. Advantageously, a cross-flow gas stream, say of air, is projected across the sodium silicate stream at an intermediate point between the discharge means and segregation barriers. This cross-flow stream alters the trajectory of the droplets in the main discharge stream by modifying the path of, for instance, the smaller droplets and thereby improving the size classification. Thus the droplets of high velocity-low mass will be prevented from assuming a trajectory identical with those of low velocity-high mass which may disturb the accuracy of the size classification.

In another specific embodiment of my invention, a stream of droplets of a coagulative liquid is gravitated downwardly in an elongated tower. At least one cross-flow gas stream, and advantageously a plurality of them, with opposite pockets or collection troughs, are projected across the gravitating stream which divert some of the droplets into these pockets. Additional particles collect at the bottom of the tower or a gelling environment may be provided there for forming solid microspheres of those particles of the desired size range.

Still another specific embodiment of my invention comprises discharging the coagulative liquid from a spray line vertically located and to which is affixed a suitable nozzle which projects the discharge stream outwardly at the oblique angle. For instance, a disc type nozzle or a sprayer containing a plurality of openings obliquely located in an inverted comb will provide the oblique angle of discharge. The discharge stream then passes through a segregation means which permits only those droplets of desired size to enter a drying or gelling chamber. This method is ideally suited for discharging a hydrogel slurry, the droplets of desired size being segregated and are then allowed to pass into a drying chamber directly beneath the segregation means. The hardened or dried particles of desired size are then collected at the bottom of the chamber.

The coagulative liquid is discharged as droplets and where minute particles are required this is advantageously accomplished by the use of an atomizer. In any event the discharge mechanism will comprise any sprayer that will deliver the liquid as a stream of droplets at the required angle. As I have already indicated, the oblique angle of discharge may be supplied in a variety of ways, for instance, by discharging the liquid at any angle between the horizontal and vertical from a sprayer so positioned. Or the sprayer may be so constructed as to deliver the discharge stream at the oblique angle although the nozzle itself is vertically located. On the other hand, the spray stream can be initially delivered vertically and the oblique angle or stream trajectory supplied by at least one side cross-flow gas stream.

The segregation means will be adapted to the droplet stream that is to be size classified. Advantageously, I contemplate a segregation means comprising a plurality of properly-positioned barriers or troughs with suitably placed openings between them. In this way, the droplets of desired size pass through the openings, while the droplets of undesirable size are collected in the troughs where they may be collected for redischarge. In this regard, when the liquid is atomized into a stream of droplets, such as of aqueous sodium silicate, and then passed into a gelling environment or zone, the segregation means preferably comprises vertically inclined troughs with slit-like openings between them. Droplets of desired size thus pass into a gelling or hardening zone directly beneath the troughs by means of the small openings between them, while the remaining droplets are collected and recycled for subsequent discharge. Of course, the barriers or troughs are so positioned with respect to the openings between them to take into account the varying trajectories of the particles to be segregated. Where the discharged liquid does not gel or harden too rapidly as in the case of using an aqueous sodium silicate solution for discharge, it is simple to recycle the solution of the rejected droplet for redischarge. When the droplets are gravitated vertically downwardly in a stream, the collection troughs or barriers are located at the sides of an elongated tower, gas side streams along the vertical path blowing or diverting some of the droplets into them, while additional droplets may be also collected at the bottom of the tower.

The droplets may be solidified or hardened at any point intermediate to discharge and ultimate collection, although in the examples I have mentioned the hardening or solidifying is accomplished subsequent to segregation. The solidification may be accomplished in a variety of ways depending in large measure upon the discharge material. For instance, where an aqueous sodium silicate solution is employed, the droplets of desired size are advantageously gelled in an acidic medium, usually in liquid phase. However, the gelling material may comprise a fine acid mist or other suitable hardening means. Where a hydrogel slurry, say silica hydrogel, is discharged, the droplets are hardened simply by passing them through air which may be heated to elevated temperatures to accelerate hardening.

The discharge material in general includes coagulative liquids of the nature of sodium silicate solutions, hydrogel slurries or hydrosols. A stable aqueous solution of sodium silicate is particularly advantageous since it is readily susceptible of gellation while at the same time the solution collected at the segregation troughs may be easily recycled. On the other hand, a dispersed hydrogel slurry is useful for discharge. I particularly include hydrogel slurries containing in the nature of about 10% by weight of solids in an aqueous material. Here again the rejected droplets may be collected for redischarge, although they may have to be "worked up" again. Hydrosols may be used for discharge in accordance with my invention. Although silica hydrosol, for instance, may gel before collection and recycling, the "fines"-forming droplets and the coarser than 100 mesh-forming droplets can still be removed from the stream. The discharge material may even include multi-component systems, such as slurries of magnesia-silica hydrogel, or of silica alumina hydrogels or of silica-magnesia-alumina hydrogels, and so forth.

Droplets forming particles in a wide range of the smaller sizes may be classified according to my process and my invention is not limited to any specific range. For instance, using a stable aqueous solution of sodium silicate, particles which will ultimately yield components ideally suited for fluid catalyst cracking, i. e., those in the size range corresponding to 150 to 200 mesh, are classified.

A preferred embodiment of my invention comprises using a spray stream of aqueous sodium silicate solution. In my copending application Serial No. 54,317, filed October 15, 1948, I have already described a method whereby a stable aqueous solution of sodium silicate can be sprayed or atomized into an acidic gelling environment so as to produce firm, substantially spherical particles of silica gel. The resulting microspheres may be processed by washing, impregnation, precipitation, and the like, to yield effective catalytic compositions. The acidic zone, most advantageously, comprises an upper layer of an acidic agent, say sulfur dioxide in oil, and a lower layer of a dilute acid, say dilute sulfuric acid. Thus the particles of silica gel settle from the acid oil and collect in the dilute aqueous acid layer from which they may be continuously withdrawn.

The size of the silica gel spheres is essentially determined by the dispersion step. For instance, gel spheres which will produce a final microspherical product in the approximate range of from 10 to 100 microns are produced by spraying the solution through an orifice of 0.018 inch in diameter. With gas or vapor atomization of the silicate solution, the particle size is also largely controlled by variation in the spray pressure. Other factors of consequence are variations in the density and temperature of the silicate solution, the velocity with which the silicate solution hits the oil surface, and the viscosity of the oil.

Spheroidal particles thus prepared may be employed as catalyst components for a variety of different cracking catalysts. Generally, catalyst components formed in this manner are utilized in hydrocarbon conversion processes directed towards amination, polymerization, hydrogenation, dehydrogenation, alkylation, Fischer-Tropsch conversion, and the like. Specifically, these catalysts are particularly valuable in those pyrolytic conversions of hydrocarbons involving the use of catalysts wherein a finely divided solid contact material is transported in a fluid stream through various zones of treatment, a conversion method commonly identified as "fluid" catalytic cracking.

Figure 1 is a cross-sectional side view showing somewhat schematically the process of my invention wherein a stable aqueous sodium silicate solution is dispersed as the stream, illustrating particularly the atomizing or discharge means, collection troughs and the acidic gelling zone.

Figure 2 is a top view of the apparatus illustrated in Figure 1, showing especially the recycle provisions in the flow diagram.

As illustrated in Figures 1 and 2 of the accompanying drawings a solution of stable aqueous sodium silicate is passed through line 10 to atomizing nozzle 11 by pump 24. The stream is projected into an inert gaseous atmosphere 13, advantageously air, at an oblique angle 12, in a trajectory leading to an acidic gelling zone 14. The acidic gelling zone 14 comprises an upper layer 15 of sulfur dioxide dissolved in oil and a lower layer 16 of dilute acid, say dilute sulfuric acid. Vertically inclined collection troughs or barriers 17, 18 and 19 prevent droplets of undesired size from passing into the acidic gelling environment 14 and wherein the silicate solution is collected for recycling. The recycle solution flows from the vertically inclined troughs into lines 20, 21 and 22, then to line 23 for redischarge by line 10 and pump 24. Fresh sodium silicate solution is introduced through line 37. The stream as schematically illustrated may comprise trajectories 31, 32, 33 and 34 for the various sized particles. The trajectory 32 of the droplets to be collected passes through an opening between barrier 17 and 18 into acidic zone 14. Pump 25 removes the gaseous sulfur dioxide by vent line 26 that may rise out of the acid layer 15. The gelled silica microspheres pass through the acid layers and are collected at the bottom 27 of the lower zone 16, then removed by valve 28 and line 29. A cross-flow stream of air across the silica liquid stream is provided by line 30.

The process operates as follows: Fresh stable aqueous sodium silicate solution is introduced through line 37 whereupon it passes to atomizing nozzle 11 by line 10 and pump 24. The stream, composed of microspheres of various sizes, is projected at an oblique angle 12 into an inert gaseous atmosphere 13, advantageously air. The droplets assume different trajectors 31, 32, 33 and 34 depending upon air friction, gravity and the mass velocity force. By the proper positioning of barriers 17, 18 and 19 only those droplets of desired size are passed to the acidic environment, as illustrated by trajectory 32. A cross-flow gas stream from line 30 located at an intermediate point between the discharge orifice 11 and the collecting means will vary the paths of the droplets so that the undesired droplets will not pass into the acidic gelling zone 14. That is, since the silica droplets may emerge from the nozzle at different velocities, this cross-flow stream will provide means so that droplets of low velocity-high mass and high velocity-low mass will not follow identical trajectories and thus impair somewhat the accuracy of the size classification. The collection troughs 17, 18 and 19 are vertically inclined so that the silicate droplets of undesired size are collected as a solution, and then passes by lines 20, 21 and 22, to line 23 for recycling to the discharge nozzle. Troughs 17 and 18 are placed so that there is an opening between them, allowing passage of droplets in the trajectory 32. The troughs on their overlapping ends 35 and 36 are finished so that the particles cannot splatter or otherwise deform while passing into the acid environment. The upper acid layer 15 comprises sulfur dioxide dissolved in oil; the gaseous $SO_2$ may thus rise to the collection troughs and gel the solutions therein prior to recycling; to prevent this a vent 26 is provided through which this $SO_2$ is drawn off by pump 25. The silicate droplets pass through the acid layers and are gelled. The microspheres of silica hydrogel thus formed and size classified are collected at the bottom 27 of the acid zone 14 and removed by line 29 through valve 28.

I claim:

1. The method of forming and size classifying small, substantially spherical, solid particles which comprises discharging a body of aqueous sodium silicate solution as a stream of droplets at an oblique angle, segregating the discharged liquid droplets into at least two fractions according to the difference of their trajectories, collecting one of said fractions while still liquid, recycling said fraction to said body of aqueous sodium silicate solution, solidifying another fraction of said droplets by contacting with a fluid acidic medium, and collecting the solidified fraction.

2. The method of claim 1 wherein the discharged stream of droplets is subjected to a cross-flow gas stream to improve size classification of the droplets according to their assumed trajectories by further modifying the paths of the droplets according to size.

JOHN L. GRING.

References Cited in the file of this patent

UNITED STATES PATENTS

| Number | Name | Date |
|---|---|---|
| 518,082 | Stuckey | Apr. 10, 1894 |
| 881,296 | Briddon et al. | Jan. 10, 1907 |
| 1,358,375 | Koch | Nov. 9, 1920 |
| 1,660,682 | Stebbins | Feb. 28, 1928 |
| 1,843,576 | McClure | Sept. 2, 1932 |
| 2,255,206 | Duncan | Sept. 9, 1941 |
| 2,338,779 | Mutch | Jan. 11, 1944 |
| 2,435,158 | Read | Jan. 27, 1948 |
| 2,506,316 | Pierce | May 2, 1950 |